(12) United States Patent
Pravica

(10) Patent No.: US 10,907,014 B2
(45) Date of Patent: Feb. 2, 2021

(54) POLYMER COMPOSITIONS

(71) Applicant: THE BOARD OF REGENTS OF THE NEVADA SYSTEM OF HIGHER EDUCATION on behalf of THE UNIVERSITY OF NEVADA, Las Vegas, NV (US)

(72) Inventor: Michael Pravica, Henderson, NV (US)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 22 days.

(21) Appl. No.: 16/321,249

(22) PCT Filed: Aug. 15, 2016

(86) PCT No.: PCT/US2016/047080
§ 371 (c)(1),
(2) Date: Jan. 28, 2019

(87) PCT Pub. No.: WO2018/034650
PCT Pub. Date: Feb. 22, 2018

(65) Prior Publication Data
US 2019/0161578 A1 May 30, 2019

(51) Int. Cl.
| | |
|---|---|
| *C08G 67/00* | (2006.01) |
| *B01J 19/12* | (2006.01) |
| *C08L 101/00* | (2006.01) |
| *B01J 3/06* | (2006.01) |
| *B01J 19/00* | (2006.01) |

(52) U.S. Cl.
CPC ............... *C08G 67/00* (2013.01); *B01J 3/06* (2013.01); *B01J 19/0006* (2013.01); *B01J 19/125* (2013.01); *C08L 101/00* (2013.01); *B01J 2219/00162* (2013.01); *B01J 2219/1203* (2013.01)

(58) Field of Classification Search
CPC . C08G 67/00; C08L 101/00; B01J 3/06; B01J 19/0006; B01J 19/125; B01J 2219/00162; B01J 2219/1203
See application file for complete search history.

(56) References Cited

U.S. PATENT DOCUMENTS

| | | | |
|---|---|---|---|
| 2002/0100309 A1 | 8/2002 | Xu et al. | |
| 2005/0061745 A1* | 3/2005 | Xie | B01J 20/28052 210/656 |
| 2015/0196777 A1 | 7/2015 | Pravica, Sr. | |

OTHER PUBLICATIONS

Bernard et al., "Decomposition and Polymerization of Solid Carbon Monoxide Under Pressure," Physical Review Letters, 1998, 81(10): 2092-2095.
Bose et al., "Decomposition of γ-irradiated strontium oxialate," Radiation Effec. Defec. Solids, 1998, 145(3): 263-270.
Ceppatelli et al., "Pressure Induced Reactivity of Solid CO by FTIR Studies," J. Phys. Chem. B, 2009, 113: 6652-6660.
Evans et al., "Pressure-Induced Polymerization of Carbon Monoxide: Disproportionation and Synthesis of an Energetic Lactonic Polymer," Chem. Mater, 2006, 18(10): 2520-2531.
Ewing, "Infrared spectra of liquid and solid carbon monoxide," J. Chem. Phys., 1962, 37: 2250-2256.
Hansen, "The infrared absorption spectrum of carbon dioxide ice from 1.8 to 333 µm," Geophys. Res., 1997, 102, pp. 21(E9): 21569-21587.
International Search Report and Written Opinion for Application No. PCT/US2016/047080 dated Nov. 2, 2016 (7 pages).
Isokoski et al., "Highly resolved infrared spectra of pure CO2 ice (15-75 K)," Astronomy & Astrophysics, 2013, 555: A85, 6 pages.
Ito et al., "The Vibrational Spectra of Formate, Acetate, and Oxalate Ions," Canadian Journal of Chemistry, 1956, 34 (2):170-178.
Jacobson et al., "Infrared dielectric response and lattice vibrations of calcium and strontium oxides," J. Phys. Chem. Solids, 1968, 29(6): 967-976.
Katz et al., "New Phases and Chemical Reactions in Solid CO under Pressure," J. Phys. Chem., 1984, 88:3176-3179.
Lipp et al., "High-energy-density extended CO solid," Nature Materials, 2005, 4: 211-215.
Mills et al., "New Phases and Chemical Reactions in Solid CO Under Pressure," Journal de Physique Colloques, 1984, 45(C8): C8-187-C8-190.
NIST Chemistry WebBook, SRD 69, "Strontium oxalate," 2011. <https://webbook.nist.gov/cgi/cbook.cgi?ID=B6000066&Mask=80>.
Pravica et al., "A novel method for generating molecular mixtures at extreme conditions: The case of fluorine and oxygen," APS SCCM Conference Proceedings, 2015.
Pravica et al., "A Novel Synthesis of Polymeric Carbon Monoxide via Useful Hard X-ray Photochemistry," Poster presented at the Gordon Research Conference on Energetic Materials in Stowe Vermont, Jun. 2016.
Pravica et al., "A novel synthesis of polymeric CO via useful hard X-ray photochemistry," Cogent Physics, 2016, 3: 1169880.
Pravica et al., "A novel synthesis of polymeric CO via useful hard X-ray photochemistry," NNSA SSAP Symposium forth Bethesda, MD. Feb. 2016. Retrieved from the Internet <https://www.orau.gov/ssap2016/presentations/WhiteFlint/Thurs-PM/pravica.pdf>.
Pravica et al., "Communication: A novel method for generating molecular mixtures at extreme conditions: The case of hydrogen and oxygen," J. Chem. Phys., 2014, 141: 091107.
Pravica et al., "High pressure X-ray photochemical studies of carbon tetrachloride: Cl2 production and segregation," Chem. Phys. Lett., 2013, 530: 74-76.
Pravica et al., "High-Pressure Far- and Mid-Infrared Study of 1,3,5-Triamino-2,4,6-trinitrobenzene," J. Phys. Chem. A, 2009, 113 (32): 9133-9137.

(Continued)

*Primary Examiner* — Jessica M Roswell
(74) *Attorney, Agent, or Firm* — Michael Best & Friedrich LLP

(57) ABSTRACT

Compositions including one or more polymers are provided. Exemplary polymers include polymeric carbon monoxides. The compositions can be prepared by subjecting a source material to x-rays, optionally at increased pressures. The compositions can be used in a variety of applications, such as fuels, optics, and electronics.

20 Claims, 6 Drawing Sheets

(56) References Cited

OTHER PUBLICATIONS

Pravica et al., "High-pressure X-ray diffraction studies of potassium chlorate," J. Appl. Cryst., 2012, 45(1): 48-52.
Pravica et al., "Hydrazine at high pressure," Chem. Phys. Lett., 2013, 555: 115-118.
Pravica et al., "Measurement of the Energy Dependence of X-ray-Induced Decomposition of Potassium Chlorate," J. Phys. Chem., 2013, 117(11): 2302-2306.
Pravica et al., "Note: A novel method for in situ loading of gases via x-ray induced chemistry," Rev. Sci. Inst., 2011, 82: 106102, 4 pages.
Pravica et al., "Note: Experiments in hard x-ray chemistry: in situ production of molecular hydrogen and x-ray induced combustion," Rev. Sci. Inst., 2012, 83: 036102, 4 pages.
Pravica et al., "Note: Loading method of molecular fluorine using x-ray induced chemistry," Review of Scientific Instruments, 2014, 85(8): 086110, 2 pages.
Pravica et al., "Studies in useful hard x-ray photochemistry: decomposition of potassium halates," Journal of Physics: Conference Series 500, 2014, 022009.
Pravica et al., "X-ray induced mobility of molecular oxygen at extreme conditions," Appl. Phys. Lett., 2013, 103: 224103, 4 pages.
Podeszwa et al., "Crystal Orbital Study of Polycarbonyl," International Journal of Quantum Chemistry, 2003, 95: 638-642.
Rademacher et al., "Preparation and characterization of solid carbon monoxide at high pressure in the diamond anvil cell," <http://photon-science.desy.de/annual_report/files/2011/20111732.pdf> 2011.
Snow et al., "Poly(carbon suboxide). Characterization, Polymerization, and Radical Structure," Macromolecules, 1978, 11(1): 77-86.
Yong et al., "Heat capacity and phase equilibria of wadeite-type $K_2Si_4O_9$," Contrib Mineral Petrol, 2008, 155: 137-145.
European Patent Office Extended Search Report for Application No. 16913601.7 dated Jan. 8, 2020 (13 pages).
Santoro et al., "High Pressure Synthesis of All-Transoid Polycarbonyl [—(C=O)—]$_n$ in a Zeolite," Chem. Mater., 2015, 27(19): 6486-6489.
European Patent Office Action for Application No. 16913601.7 dated Sep. 25, 2020 (6 pages).

* cited by examiner

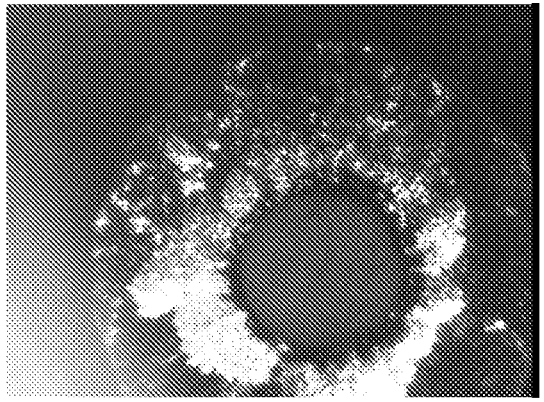 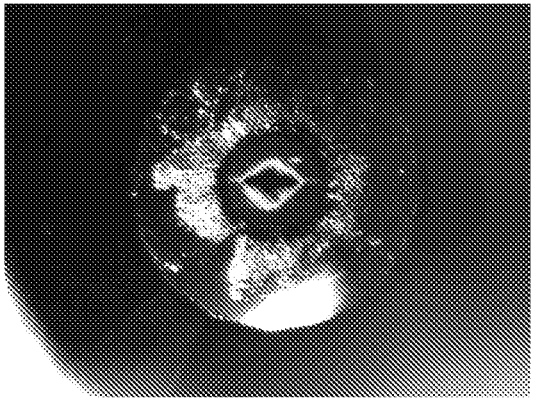
FIG. 1A  FIG. 1B
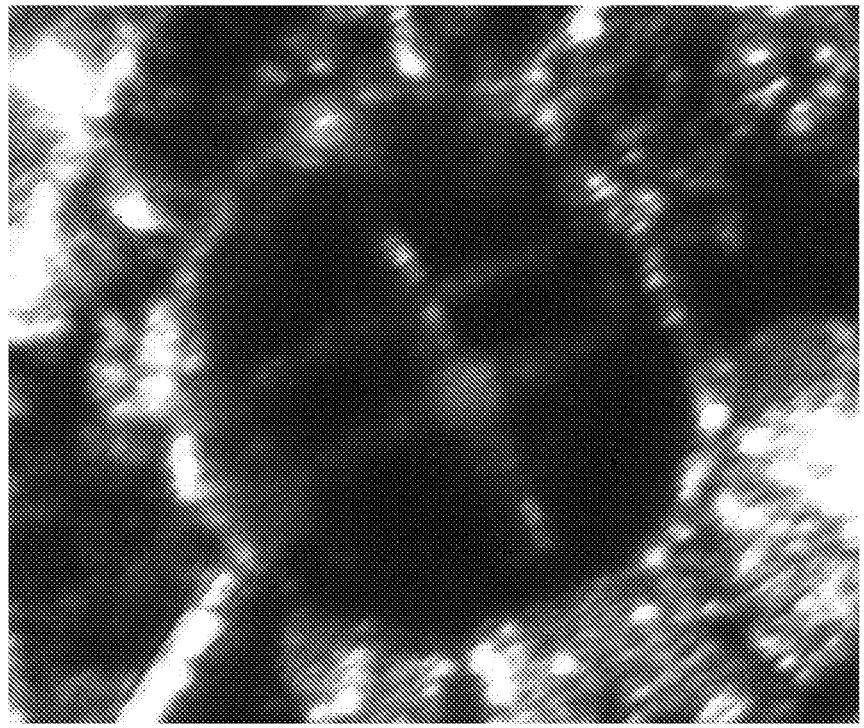
FIG. 2

POLYMER COMPOSITIONS

STATEMENT OF GOVERNMENT INTEREST

This invention was made with government support under Award Number DE-NA0002912 and DOE Cooperative Agreement No. DE-FC08-01NV14049 with the University of Nevada, Las Vegas, awarded by the Department of Energy National Nuclear Security Administration. The government has certain rights in the invention.

CROSS-REFERENCE TO RELATED APPLICATION(S)

This is a U.S. national stage entry of International Patent Application No. PCT/US2016/047080, filed on Aug. 15, 2016, the entire contents of which are fully incorporated herein by reference.

TECHNICAL FIELD

The present disclosure relates to polymer compositions and methods of synthesizing polymer compositions, and more particularly, methods of synthesizing polymers using x-rays.

BACKGROUND

Polymers are a class of chemicals that find a variety of industrial uses. There are numerous types of polymers and methods of synthesizing polymers. Nonetheless, there exists a need for new polymeric materials and methods of preparing polymeric materials.

SUMMARY

In one aspect, disclosed are methods of creating a polymer. The methods can include loading a source material (e.g., a powdered source material) into an apparatus; sealing the apparatus; optionally pressurizing the apparatus to a selected pressure; and irradiating the source material in the apparatus with x-rays for an irradiation time.

In another aspect, disclosed are compositions including one or more polymers, produced by the process of subjecting a source material to x-rays, optionally under a pressurized atmosphere.

In another aspect, disclosed are compositions including a polymeric carbon monoxide.

BRIEF DESCRIPTION OF THE DRAWINGS

FIGS. 1A-1B show images of a strontium oxalate ($SrC_2O_4$) sample loaded at 7 GPa before irradiation looking through one diamond (FIG. 1A) and the same pressurized sample after ~4 hours of irradiation examined one day later (FIG. 1B).

FIG. 2 shows an image of irradiated $SrC_2O_4$ under a 514.5 nm laser.

Some notable modes of various chemical decomposition species have been identified with arrows.

Figure 5:
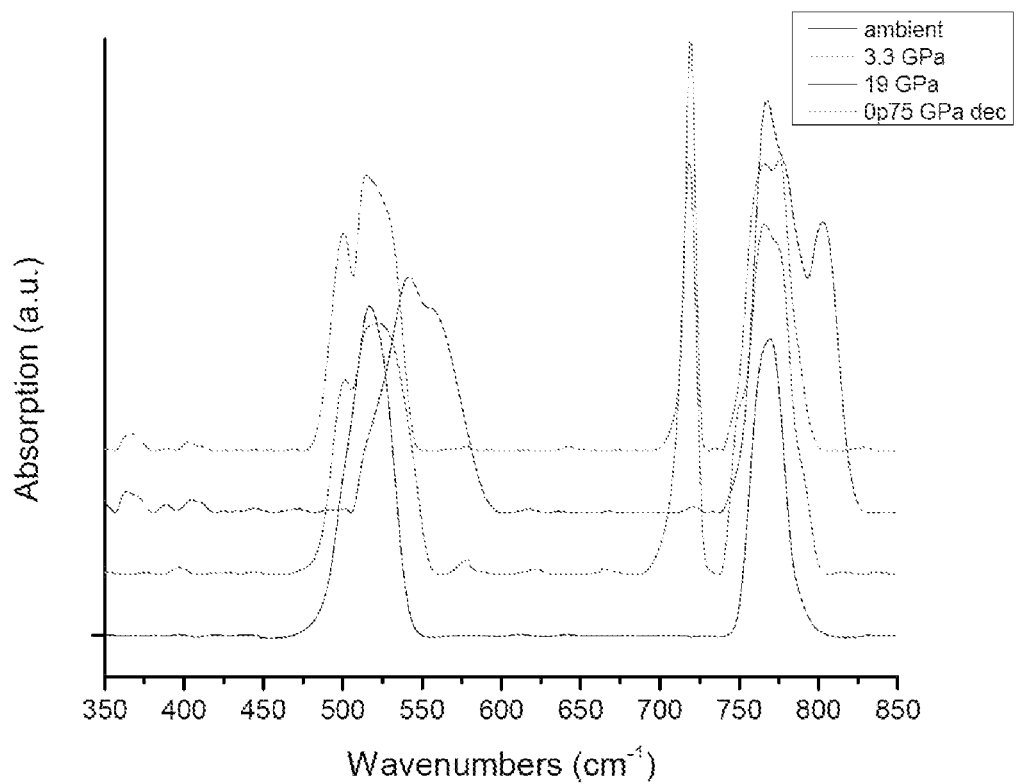

FIG. 5 shows far-IR spectra of virgin, unirradiated strontium oxalate. The patterns appear similar except that the pattern 19 GPa is blue shifted and a splitting of both of the two primary peaks is evident. The pattern labeled 0.75 GPa was taken after decompression to 0.75 GPa and appears very similar to the pattern taken at 3.3 GPa indicating that all pressure-induced changes were reversible (with some potential hysteresis) and no irreversible polymerization occurred with only pressurization.

Figure 6A:
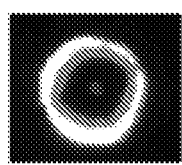
Figure 6B:
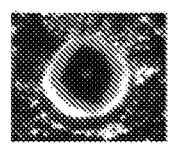
Figure 6C:
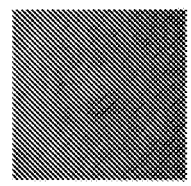

FIGS. 6A-6C show photos of irradiated $SrC_2O_4$ for the different pressures: 3.21 GPa (FIG. 6A), 1.05 GPa (FIG. 6B), and ambient in a capillary (FIG. 6C).

Figures 7A, 7B:
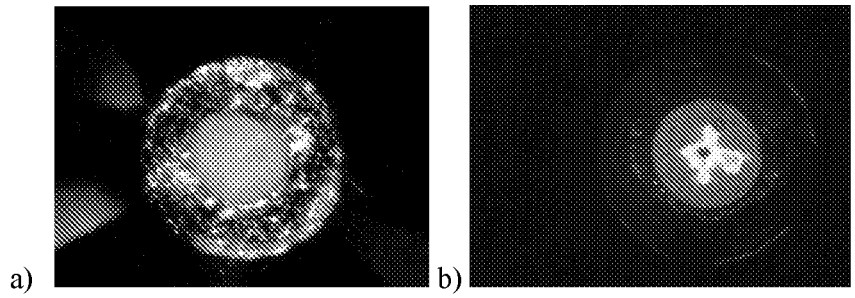

FIG. 7A shows unirradiated calcium oxalate ($CaC_2O_4$) and FIG. 7B shows irradiated $CaC_2O_4$ at 2 GPa of pressure.

Figure 8:
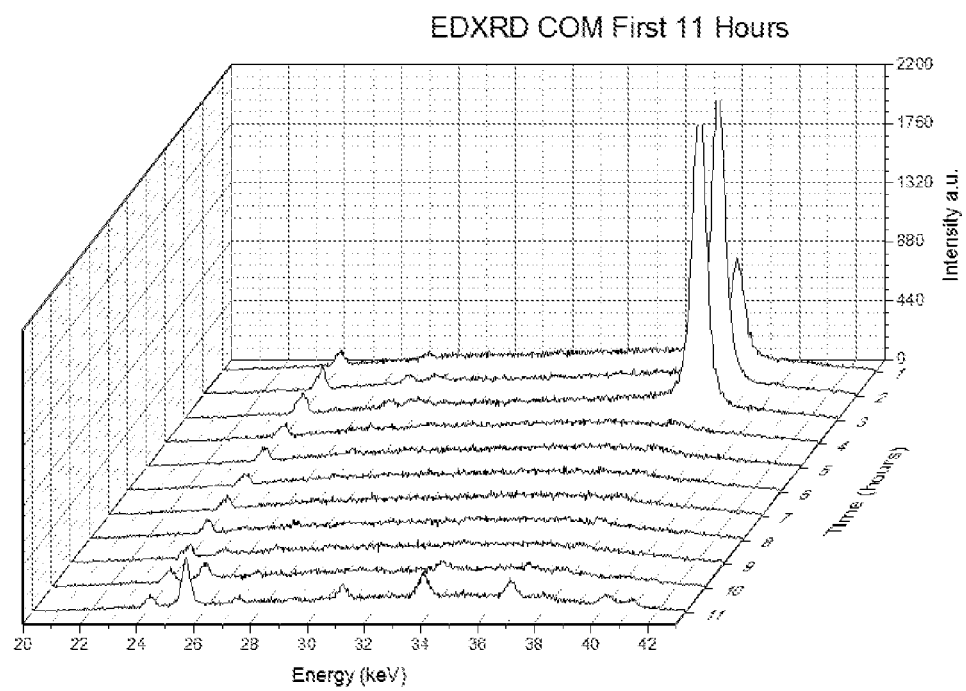

FIG. 8 shows energy-dispersive x-ray diffraction (EDXRD) data demonstrating the decomposition of $CaC_2O_4$ into CaO near ambient conditions.

Figure 9A:
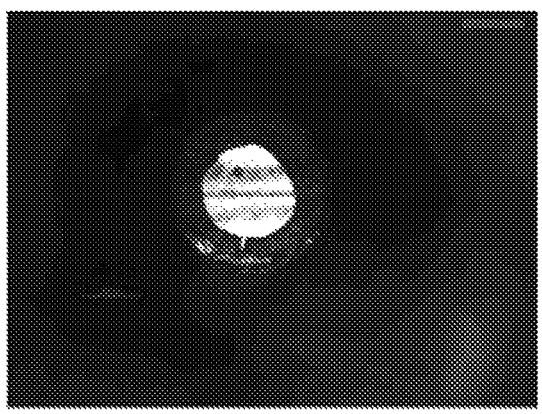
Figure 9B:
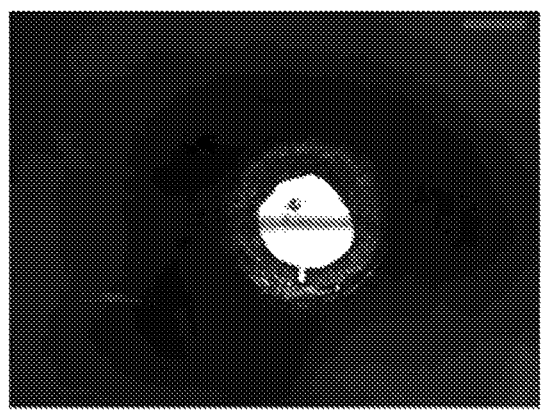

FIGS. 9A-9B show pressurized magnesium oxalate ($MgC_2O_4$) irradiated in the 16 ID-D beam line. FIG. 9A shows the sample after undergoing irradiation for 7 hours.

Figure 10:
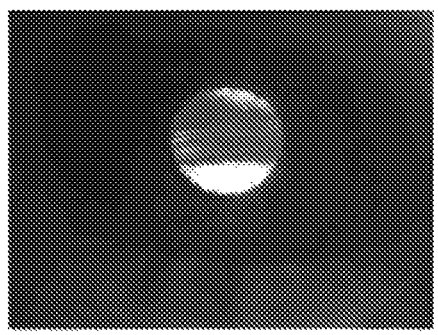

FIG. 10 shows pressurized hydrogen oxalate ($H_2C_2O_4$), near 0.4 GPa, irradiated in the 16 ID-D beam line. The sample was irradiated for 2 hours.

DETAILED DESCRIPTION

Disclosed herein are compositions comprising one or more polymers. The compositions can be prepared by x-ray (e.g., hard x-ray) induced decomposition of selected source materials (e.g., oxalate salts). The compositions can be used in various applications, such as fuel sources, optics, and semiconductors. Also disclosed are methods of preparing compositions comprising one or more polymers by x-ray induced decomposition of selected source materials. The methods can optionally be performed under pressure (e.g., 7 GPa). The methods can be scaled-up to provide large quantities of the disclosed compositions. As such, the disclosed compositions and methods have potential for commercial application.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. COMPOSITIONS

In one aspect, disclosed are compositions comprising one or more polymers. The compositions can be produced via x-ray-induced decomposition of select starting materials. Optionally, the compositions can be produced in a pressurized environment. The polymers can be in an energetic state, a metastable state, or a stable state. The polymers can have certain parts which are in energetic, metastable, or stable states, while other parts are in different states. The polymers can be in a polycrystalline or amorphous state.

In certain embodiments, the disclosed compositions include a polymeric carbon monoxide (also referred to as polycarbonyl). The disclosed compositions may exhibit peaks in an infrared spectrum, evincing the presence of a polymeric carbon monoxide. For example, the disclosed compositions may exhibit peaks near 1,120 cm$^{-1}$ or 1,270 cm$^{-1}$, attributable to polymeric carbon monoxide. The compositions including polymeric carbon monoxide can be waxlike. The compositions including polymeric carbon monoxide may appear dark brown, red, or yellow in color. The polymeric carbon monoxide may comprise repeating units of formula:

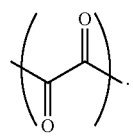

In certain embodiments, the disclosed compositions can comprise one or more additional components. The components may be dispersed within the composition. In certain embodiments, the components may be trapped in a matrix of the composition.

In certain embodiments, the compositions include carbon dioxide dispersed in the composition. The carbon dioxide may be trapped within the compositions. For example, the carbon dioxide may be trapped within a matrix of polymeric carbon monoxide when the composition is under a pressure of 100 kPa or above. Infrared spectroscopy may be used to verify this. In certain embodiments, the compositions include one or more oxides dispersed in the composition. The oxides may be derived from the oxides of the cation of oxalate salts. In certain embodiments, the oxides dispersed in compositions may be MgO, H$_2$O, BaO, CaO, or SrO. In certain embodiments, gaseous CO$_2$ and SrO may be dispersed in compositions of polymeric carbon monoxide.

3. PRODUCT BY PROCESS

In another aspect, disclosed are compositions produced by the process of subjecting a selected source material to x-rays (e.g., hard x-rays), optionally in a pressurized environment. In certain embodiments, the compositions can be produced by the process of irradiating a source material in an apparatus with x-rays, optionally under an applied pressure, for a selected time. In certain embodiments, the compositions can be produced by the process of loading a powdered source material into an apparatus; sealing the apparatus; pressurizing the apparatus to a selected pressure; and irradiating the source material in the apparatus with x-rays for selected time. The compositions can include one or more polymers, such as the polymers disclosed herein.

4. SYNTHETIC METHODS

In another aspect, disclosed are methods of preparing compositions produced via x-ray-induced decomposition of a source material. The disclosed methods can be used to produce compositions comprising one or more polymers.

In certain embodiments, a method of preparing a disclosed composition includes irradiating a source material in an apparatus with x-rays, optionally under an applied pressure, for a selected time. In certain embodiments, a method of preparing a disclosed composition includes loading a powdered source material into an apparatus; sealing the apparatus; pressurizing the apparatus to a selected pressure; and irradiating the source material in the apparatus with x-rays for selected time. The disclosed methods can be used to produce compositions comprising one or more polymers, such as the compositions and polymers disclosed herein.

Source materials suitable for use in the disclosed methods include substances that can be used to generate polymeric materials when subjected to x-rays, optionally at increased pressures. The source materials can be powdered source materials. In certain embodiments, the source material can comprise one or more oxalate salts. In certain embodiments, the source material may be strontium oxalate, hydrogen oxalate, barium oxalate, calcium oxalate, or magnesium oxalate. In certain embodiments, the source material may be powdered strontium oxalate, powdered hydrogen oxalate, powdered barium oxalate, powdered calcium oxalate, or powdered magnesium oxalate. In certain embodiments, the source material may be made of oxalate salts and substances that react in the presence of x-rays. An example of a substance that reacts in the presence of x-rays is KBF$_4$. In certain embodiments, the source material may be made of oxalate salts and substances that do not react in the presence of x-rays. An example of a substance that does not react in the presence of x-rays is $BaCO_3$. In certain embodiments, the source material may be made of oxalate salts, substances that react in the presence of x-rays, and substances that do not react in the presence of x-rays. The amount of source material that can be polymerized can be in the range of milligrams to kilograms. In certain embodiments, the amount of source material that can be polymerized is 3 mg to 30 kg, 3 g to 3 kg, or 3 kg to 30 kg, or 30 kg and greater.

The apparatus of the disclosed methods may be a diamond anvil cell or a high volume press. In certain embodiments, the apparatus may be a Paris-Edinburgh Cell. After the powdered source material is loaded into an apparatus and the apparatus is sealed, the apparatus may be pressurized to a selected reaction pressure. In certain embodiments, the selected pressure may be in the range of 0.5 GPa to 15 GPa, 1 GPa to 10 GPa, or 2 GPa to 5 GPa. In certain embodiments, the selected pressure may be in the range of 0.5 GPa to 7 GPa.

The source material in the apparatus may be irradiated with x-rays for a selected irradiation time. In certain embodiments, the x-rays may be classified as hard x-rays and have irradiation energy in the range of 5 keV to 100 keV, 10 keV to 90 keV, 20 keV to 80 keV, or 40 keV to 60 keV. In certain embodiments, the irradiation energy may be in the range of 7 keV to 15 keV. In certain embodiments, the irradiation time may be in the range of 15 minutes to 10 hours, 30 minutes to 8 hours, 1 hour to 6 hours, or 2 hours to 4 hours. In certain embodiments, the irradiation time may be in the range of 30 minutes to 7 hours. In certain embodiments, the rate of polymerization of the source material may be on the order of minutes. In certain embodiments, the rate of polymerization of the source material may be on the order of hours.

In certain embodiments, the disclosed methods can be conducted at or above ambient temperature.

5. METHODS OF USE

The disclosed compositions may be used in a variety of applications. In certain embodiments, the compositions can be energetic materials. In certain embodiments, the compositions can be used as fuel sources. For example, in certain embodiments, a composition including a polymeric carbon monoxide can be utilized as rocket fuel. In certain embodiments, the compositions can be used in optics applications. In certain embodiments, the disclosed compositions may have properties amenable to electrical applications. In certain embodiments, a disclosed composition including a polymer (e.g., polymeric carbon monoxide) and an oxide (e.g., SrO) may allow for precision controllable bandgaps in semiconductors.

6. EXAMPLES

The present disclosure has multiple aspects, illustrated by the following non-limiting examples.

Example 1

Synchrotron Hard X-Ray Induced Decomposition of Strontium Oxalate

A symmetric-type Diamond Anvil Cell (DAC) was used to perform the irradiation experiment. A 250 μm thick stainless steel gasket was preindented to ~20 μm thickness and a sample-containing hole of diameter ~130 μm was drilled via electric discharge machining. The diamonds each had a culet diameter of ~500 μm and were low fluorescence, type Ia quality. 10 μm of fresh powdered $SrC_2O_4$ (Alfa Aesar >95% purity) was manually loaded into the gasket hole using a needle along with one ruby for pressure measurement. The assembly was then sealed and pressurized to 7 GPa. No pressure-transmitting medium was used in this experiment which was conducted at room temperature.

The pressurized sample was irradiated at the 16 BM-B beamline in the Advanced Photon Source (APS) with white x-rays for approximately 4 hours. Raman spectroscopy was attempted on the irradiated sample unsuccessfully due to very high sample fluorescence.

The sample was then transported (still at high pressure) to the Canadian Light Source (CLS) for post-irradiation IR studies. The exciting IR beam does not excite fluorescence in samples and is a far-superior method to acquiring vibrational mode behavior in organic and stressed/damaged samples at high pressure.

Mid-IR spectra were acquired at the 01B1-1 beamline using a Bruker Vertex 77 v/S, Hyperion 3000 IR microscope. A liquid nitrogen cooled MCT detector was used. The mid-IR microscope system typically focuses the IR beam which is then spatially filtered using a 100 μm diameter circular aperture. The investigated spectral range was from 700 to 4000 wavenumbers with a resolution of 1 cm−1. An improvised jacket that surrounded the DAC and fit snugly between the objective and sample stage of the microscope with constantly flowing argon gas was used to reduce water vapor contamination.

Far-IR studies were also performed on the irradiated samples at the 02B1-1 beamline at the CLS. The collection optics and DAC were housed in front of the FT-IR system with plexiglass plates. The system was continuously purged from water vapor (as measured with a humidity sensor) using positive pressure nitrogen blowoff gas from a nearby liquid $N_2$ dewar. Far-IR spectra were collected using a Horizontal Microscope system on the Far-Infrared Beamline at the CLS. Far-IR synchrotron radiation was redirected from the sample compartment of a Bruker IFS 125 HR Spectrometer® to a long working distance Schwarzchild objective focusing the light on the sample. A similar objective behind the sample collected the transmitted light and directed it to an off-axis parabolic mirror which refocused the light into an Infrared Laboratories® Ge:Cu detector. The spectrometer was equipped with a 6 micron mylar beamsplitter and the data was collected using a scanner velocity of 40 kHz, 12.5 mm entrance aperture and a resolution of 1 $cm^{-1}$. The Ge:Cu detector was set for 16× gain. The interferograms were transformed using a zero filling factor of 8 and a 3-term Blackman-Harris apodization function.

To obtain a background mid-IR reference spectrum an IR-transmitting CaF slide was prepared with virgin, unirradiated $SrC_2O_4$ powder (~3 μm thick) for comparison purposes.

An IR transmitting diamond was used to hold a thin film (~3 μm thick) of virgin $SrC_2O_4$ for a far-IR standard measurement, also for comparison purposes. This fresh sample had been prepared by manually compressing fresh $SrC_2O_4$ between two diamonds in a symmetric-style DAC (without a gasket) and removing one of the diamonds. All measurements were performed in transmission and at room temperature. All presented spectra constituted the average of 512 scans with 2 sec/scan.

Results

An image of the virgin, unirradiated $SrC_2O_4$ sample loaded at the APS is shown in FIG. 1A, and the same sample after a 4 hour irradiation is also shown in FIG. 1B. There is no evidence that the sample temperature altered beyond ambient temperature. Examining FIG. 1A, there is also no visual evidence of chemical reaction when pressurized to 7 GPa until irradiation (FIG. 1B) at the same pressure. This corroborates that pressure by itself does not cause creation of polymer from powdered source material; hard x-rays with pressure can be used to create the polymer from the powdered source material.

On FIG. 1B, there is a very dark cross pattern that formed after irradiation which was in the shadow of the incident x-ray beam. Outside of the irradiated region, the sample yellowed and darkened significantly. Raman spectroscopy was attempted to compare with the unirradiated spectrum taken before irradiation but the irradiated sample was far too fluorescent in the presence of 532 nm laser light to collect any useful spectra. The sample appeared to rapidly decompose/burn where the laser light from the Raman spectroscopy apparatus was incident upon the material and the region where the laser was incident transformed into a shiny/metallic-looking material which is likely graphitic carbon. This is illustrated in FIG. 2.

The Raman spectrum of the sample collected just before it was irradiated indicated that the sample commenced as highly pure $SrC_2O_4$.

Figure 3:
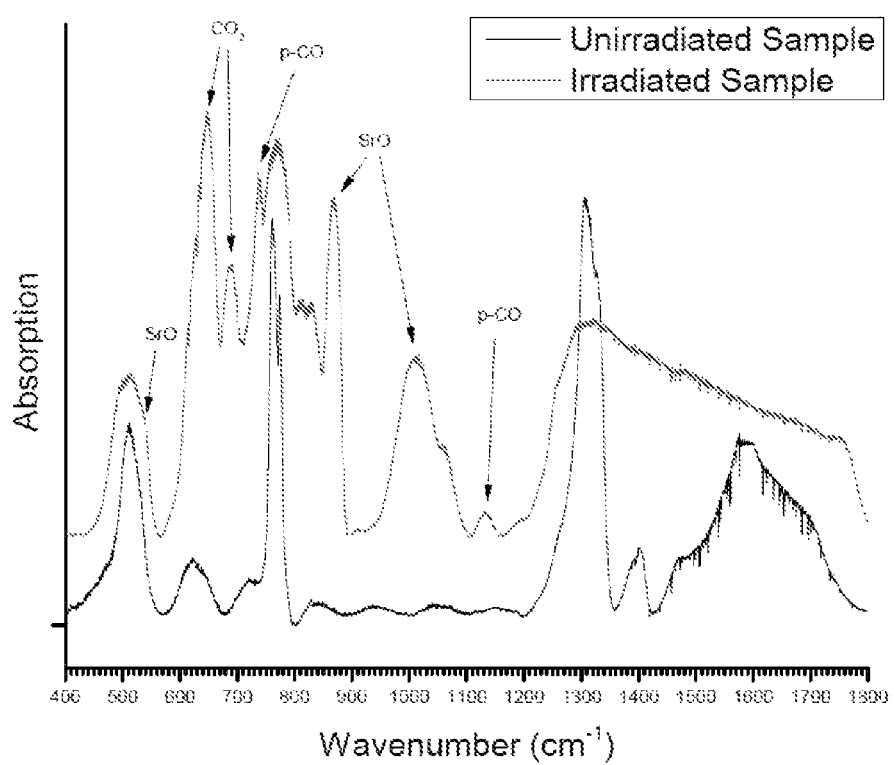
FIG. 3 shows background-subtracted far-IR transmission spectra of the irradiated/recovered (red trace) and virgin (black trace) $SrC_2O_4$ samples. Both spectra were recorded at ambient temperature and pressure.

As the diamonds were not of sufficient IR-transmitting quality, no useful IR signal could be obtained in either the far- or mid-IR range with the sample squeezed in between the diamonds. The DAC was then depressurized and the gasket was removed. When pressure was released, the recovered sample was intact and stable; it stuck to the gasket when removed from the DAC with no residue left behind on the diamonds. It was immediately noted that the colored sample remained in the gasket so that IR spectra of the depressurized and reacted sample were successfully recorded without diamond interference. The far-IR patterns of the irradiated sample (still inside the depressurized gasket but with one diamond removed) and an unirradiated virgin sample (placed on the same IR-transmitting diamond) are displayed in FIG. 3. Both spectra are background subtracted.

Figure 4:
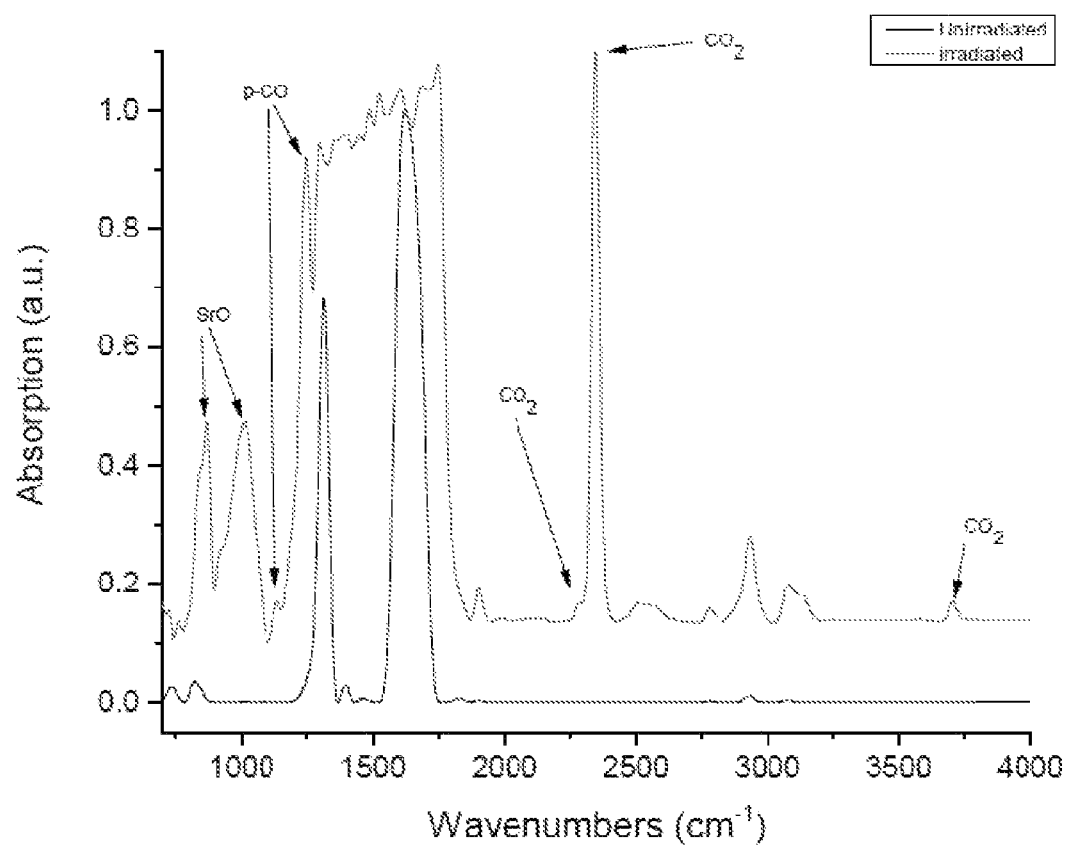
FIG. 4 shows mid-IR absorption (1—transmission) spectra of the irradiated (raised red trace) and virgin (lower black trace) $SrC_2O_4$ samples. Both spectra were recorded at ambient temperature and pressure and have been offset for clarity.

FIG. 4 displays the background-subtracted mid-IR spectra of the ambient, unirradiated $SrC_2O_4$ sample along with that of the irradiated/decompressed sample. The virgin, unirradiated mid- and far-IR spectra agree generally well with the spectrum in the prior art. The far-IR unirradiated spectrum possesses two main modes near 515 and 775 cm$^{-1}$ which are assigned to COO out-of-plane rocking [$\delta(CO_2)$] and $C_2O_4^{2-}$ anion deformation modes, respectively. Progressing toward higher frequencies (FIGS. 3 and 4), two main modes are observed near 1300 and 1660 cm$^{-1}$ which are associated with $v_{as}(CO_2)$ and $v_s$ (CO) stretching modes respectively.

Examining the irradiated/decompressed far- and mid-IR spectra, dramatic changes are apparent. In the case of the far-IR irradiated/decompressed spectrum, moving from left to right in wavenumber, a strong peak near 654 cm$^{-1}$ and a lesser one near 680 cm$^{-1}$ are likely associated with the O=C=O bending mode ($v_2$). Progressing toward higher vibrational energies, there is a very sharp peak near 725 cm$^{-1}$ which may be associated with $CO_2(v_3)$. The relatively narrow peak near 880 cm$^{-1}$ and the broad line near 1020 cm$^{-1}$ are likely SrO multiphonon bands. Finally, the small peak near 1130 cm$^{-1}$ was also observed in the recovered poly-CO samples. Beyond this, there is strong absorption and mixing of bands complicating interpretation of the spectra above 1130 cm$^{-1}$.

In the case of the irradiated mid-IR spectrum, the two primary peaks near 1275 cm$^{-1}$ and 1650 cm$^{-1}$ appear severely diminished (1275 cm$^{-1}$ line) or largely disappear (1650 cm$^{-1}$ line) again suggesting a significant reaction/transformation/polymerization of the sample. In their place, a number of new modes appear. At least three of these new lines are associated with $CO_2$: The vibration near 2349 cm$^{-1}$ is the $v_3$ antisymmetric $^{12}C=O$ stretch. The peak near 1850 cm$^{-1}$ may possibly be associated with the $CO_2$ bending mode with an overtone observed near 3700 cm$^{-1}$ or the $v_3+v_1$ mode.

Two other new peaks near 880 cm$^{-1}$ and 1030 cm$^{-1}$ are from SrO. Finally, other newly-appearing peaks may be attributed to polymeric-CO near 1120 cm$^{-1}$ and 1270 cm$^{-1}$.

By irradiating the pressurized strontium oxalate sample, molecular $CO_2$ and an energetic, yet recoverable, polymeric carbon monoxide was produced. SrO was also produced. Given the observation that $CO_2$ remained in the reacted sample/polymer (even after over one month after the sample was opened to ambient conditions), the synthesized polymer is poly-CO. The reaction took place via the following reaction sequence:

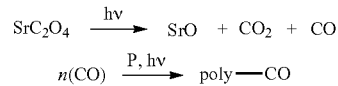

The CO would be highly reactive especially under the highly ionizing conditions wrought by highly penetrating and highly energetic hard x-rays and would then polymerize into poly-CO with further irradiation and within the matrix of inert $CO_2$ and SrO.

With the above experimental conditions, it is demonstrated that hard x-rays and pressure can synthesize a complex polymer. The hard x-ray irradiation of $SrC_2O_4$, pressurized inside a diamond anvil cell, initiated chemical reaction(s) which polymerized the strontium oxalate and produced $CO_2$ and SrO in situ within the poly-CO matrix.

This experiment was repeated with $CaC_2O_4$ in place of $SrC_2O_4$. The hard x-ray irradiation of $CaC_2O_4$, pressurized inside a diamond anvil cell, initiated chemical reaction(s) which polymerized the calcium oxalate and produced $CO_2$ and CaO in situ within the poly-CO matrix. The polymer is a highly colored substance with a waxlike, gooey consistency after exposure to air.

In both cases of the source material being strontium oxalate and being calcium oxalate, the $CO_2$ was trapped within the poly-CO matrix even when the gasket was depressurized to ambient pressure and removed from the DAC. The Sr and Ca atoms bond with oxygen to form SrO and CaO, respectively.

Example 2

Far-IR High Pressure Study of $SrC_2O_4$ without Irradiation

In order to prove that the observed polymeric synthesis was largely x-ray induced, a separate far-IR high pressure study of $SrC_2O_4$ was conducted. $SrC_2O_4$ was exposed to pressure up to 19 GPa using petroleum jelly as a pressure-transmitting medium. The preliminary results are presented in FIG. 5. The far-IR pattern found no evidence of pressure-induced polymerization or decomposition as the acquired IR spectrum after pressure release returned to that obtained under ambient conditions. In conclusion, pressure alone does not have any significant role in the polymerization of $SrC_2O_4$ to poly-CO; but pressure in combination with x-ray irradiation can be used for polymerization of $SrC_2O_4$ to poly-CO.

Example 3

Lower Pressure (~1 GPa) can Synthesize Poly-CO & Scale-Up of Poly-CO Synthesis Powdered $SrC_2O_4$ was irradiated at the 16 ID-D beamline with monochromatic x-rays (~15 keV in energy). Polymerization was rapidly observed in the pressurized samples on the order of minutes via visual methods (e.g., color change of the white/translucent sample to reddish orange) in samples that were pressurized to 1 and 2 GPa. These samples were recoverable after polymerization. Photos of irradiated $SrC_2O_4$ at 3.21 GPa, 1.05 GPa, and at ambient pressure in a capillary are shown in FIGS. 6A-6C, respectively.

An alternative route of synthesis for poly-CO at a lower pressure (~1 GPa) was found compared to the conventional 5 GPa pressure required to polymerize pure CO. Using hard x-rays and high pressure to synthesize poly-CO can be scaled up to volumes greater than 3 nL (the typical volume that DACs accomodate). The Paris-Edinburgh Cell (PEC) can pressurize samples 3 mg or greater. With multi-ton anvils, samples on the order of grams and kilograms can be pressurized to 1 GPa. Thus, kilograms of poly-CO could be produced.

Example 4

Lower Pressure & Irradiation Experiment on $CaC_2O_4$ and $SrC_2O_4$ $CaC_2O_4$ was irradiated using a 16 BM-B beamline to ascertain if poly-CO would be produced. Polymerization occurred at both high (>3 GPa) and low pressures (<3 GPa). CO and $CO_2$ were also observed via Raman spectroscopy. FIG. 7A shows unirradiated $CaC_2O_4$. FIG. 7B shows irradiated $CaC_2O_4$ at 2 GPa of Pressure. The poly-CO is the small reddish dot in the center. The x-ray beam was focused to roughly the spot size.

A bare gasket containing a recovered irradiated sample of $CaC_2O_4$ that had been pressurized near 3 GPa was examined via IR spectroscopy. $CO_2$, CaO, and poly-CO were all present. EDXRD studies confirmed the presence of CaO in the post-irradiated $CaC_2O_4$, as shown in FIG. 8. This demonstrates that poly-CO was successfully produced from the irradiation of $CaC_2O_4$ via the following chemical reactions:

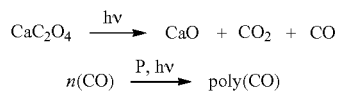

$$CaC_2O_4 \xrightarrow{h\nu} CaO + CO_2 + CO$$
$$n(CO) \xrightarrow{P, h\nu} poly(CO)$$

$SrC_2O_4$ was pressurized to 3 GPa in a DAC equipped with IR-transmitting diamonds and irradiated using a 16 BM-B beamline. This sample was studied via IR spectroscopy. SrO and poly-CO were confirmed to be present in situ. This had not been previously done due to the use of diamonds that did not transmit IR well. Thus, this experiment confirmed that polymer was inside the sealed sample that had been irradiated at 3 GPa.

Example 5

Lower Pressure & Irradiation Experiments on $SrC_2O_4$, $BaC_2O_4$, $H_2C_2O_4$, and $MgC_2O_4$ $SrC_2O_4$ was pressurized to 0.9 GPa and was polymerized when exposed to hard x-rays.

$BaC_2O_4$ was pressurized to 0.9 GPa and was also polymerized when exposed to hard x-rays. It polymerized at a faster rate than $SrC_2O_4$.

$MgC_2O_4$ was pressurized and irradiated with the 16 ID-D beamline as shown in FIGS. 9A-9B. The x-rays passed perpendicular to the diamond-diamond axis. Polymerization tracks can be seen in the photos. In FIG. 9A, the sample was irradiated for 7 hours.

$H_2C_2O_4$ was pressurized to 0.5 GPa and exposed to hard x-rays. It was determined by Raman spectroscopy that CO was contained in the irradiated sample. One sample of $H_2C_2O_4$ was pressurized to 0.4 GPa and was irradiated in the 16 ID-D beamline. The sample was irradiated for 2 hours. A photo of this sample is shown in FIG. 10.

X-ray induced synthesis of doped polymeric CO can occur at even lower pressures (<0.5 GPa). The irradiation of oxalate salts produces doped polymeric CO at far lower pressures (factor of ten) than when pressurizing only CO.

This experiment expands the repertoire for future chemical decomposition and synthesis reactions. This aids in the efforts to study the effects of diffusion, mixing, and segregation on detonation products and other chemical species at extreme conditions. This also enables the synthesis of polymers interspersed with inert oxide species which may have future electronic, optical, or fuel applications.

7. EXEMPLARY EMBODIMENTS

For reasons of completeness, various aspects of the disclosure are set out in the following numbered clauses:

Clause 1. A method of creating a polymer comprising the steps of: loading a source material (e.g., a powdered source material) into an apparatus; sealing the apparatus; optionally pressurizing the apparatus to a selected pressure; and irradiating the source material in the apparatus with x-rays for an irradiation time.

Clause 2. The method of clause 1, wherein the source material comprises an oxalate salt.

Clause 3. The method of clause 1 or clause 2, wherein the source material comprises oxalate salts and substances that react in the presence of x-rays.

Clause 4. The method of clause 1 or clause 2, wherein the powdered source material is a combination of oxalate salts and substances that do not react in the presence of x-rays.

Clause 5. The method of clause 1 or clause 2, wherein the powdered source material is a combination of oxalate salts, substances that react in the presence of x-rays, and substances that do not react in the presence of x-rays.

Clause 6. The method of clauses 3 or 5, wherein the substance that reacts in the presence of x-rays comprises $KBF_4$.

Clause 7. The method of clauses 4 or 5, wherein the substance that does not react in the presence of x-rays comprises $BaCO_3$.

Clause 8. The method of any one of clauses 2-7, wherein the oxalate salt comprises a cation which is chosen from the group consisting of magnesium, hydrogen, barium, calcium, and strontium.

Clause 9. The method of any one of clauses 1-8, wherein the apparatus is a diamond anvil cell or a high volume press.

Clause 10. The method of any one of clauses 1-9, wherein said selected pressure is in the range of about 0.5 GPa to about 7 GPa.

Clause 11. The method of any one of clauses 1-10, wherein said x-rays have an irradiation energy in the range of about 7 keV to about 15 keV.

Clause 12. The method of any one of clauses 1-11, wherein said irradiation time is in the range of about 30 minutes to about 7 hours.

Clause 13. The method of any one of clauses 1-12, wherein the polymer has electrical applications.

Clause 14. The method of any one of clauses 1-12, wherein the polymer is a rocket fuel.

Clause 15. The method of any one of clauses 1-12, wherein the polymer is energetic, metastable, stable, or a combination thereof.

Clause 16. The method of any one of clauses 1-15, wherein $CO_2$ and oxides are dispersed in said polymer as measured by infrared spectroscopy.

Clause 17. The method of clause 8, wherein the oxides comprise oxides of the cation from the oxalate salt.

Clause 18. The method of any one of clauses 1-17, wherein the polymer is polymeric CO.

Clause 19. The method of any one of clauses 1-18, wherein a temperature of the source material is ambient temperature.

Clause 20. The method of any one of clauses 1-19, wherein the source material is in an amount in the range of 3 to 10 mg.

Clause 21. The method of any one of clauses 1-20, wherein the polymer is created from the source material at a reaction rate on the order of minutes or greater.

Clause 22. A composition comprising polymeric carbon monoxide.

Clause 23. The composition of clause 22, further comprising carbon dioxide.

Clause 24. The composition of clause 22 or clause 23, further comprising a metal oxide.

Clause 25. The composition of clause 24, wherein the metal oxide is MgO, $H_2O$, BaO, CaO, or SrO.

Clause 26. The composition of any one of clauses 22-25, exhibiting peaks at 1,120 $cm^{-1}$ or 1,270 $cm^{-1}$ when analyzed by infrared spectroscopy.

Clause 27. A composition comprising one or more polymers, produced by the process of subjecting a source material to x-rays, optionally under a pressurized atmosphere.

Clause 28. The composition of clause 27, wherein the source material comprises an oxalate salt.

Clause 29. The composition of clause 27 or clause 28, wherein the source material comprises oxalate salts and substances that react in the presence of x-rays.

Clause 30. The composition of clause 27 or clause 28, wherein the source material is a combination of oxalate salts and substances that do not react in the presence of x-rays.

Clause 31. The composition of clause 27 or clause 28, wherein the source material is a combination of oxalate salts, substances that react in the presence of x-rays, and substances that do not react in the presence of x-rays.

Clause 32. The composition of clauses 29 or 31, wherein the substance that reacts in the presence of x-rays comprises $KBF_4$.

Clause 33. The composition of clauses 30 or 32, wherein the substance that does not react in the presence of x-rays comprises $BaCO_3$.

Clause 34. The composition of any one of clauses 28-33, wherein the oxalate salt comprises a cation which is chosen from the group consisting of magnesium, hydrogen, barium, calcium, and strontium.

Clause 35. The composition of any one of clauses 27-34, wherein the apparatus is a diamond anvil cell or a high volume press.

Clause 36. The composition of any one of clauses 27-35, wherein said selected pressure is in the range of about 0.5 GPa to about 7 GPa.

Clause 37. The composition of any one of clauses 27-36, wherein said x-rays have an irradiation energy in the range of about 7 keV to about 15 keV.

Clause 38. The composition of any one of clauses 27-37, wherein said irradiation time is in the range of about 30 minutes to about 7 hours.

Clause 39. The composition of any one of clauses 27-38, wherein the polymer has electrical applications.

Clause 40. The composition of any one of clauses 27-38, wherein the polymer is a rocket fuel.

Clause 41. The composition of any one of clauses 27-38, wherein the polymer is energetic, metastable, stable, or a combination thereof.

Clause 42. The composition of any one of clauses 27-41, wherein $CO_2$ and oxides are dispersed in said polymer as measured by infrared spectroscopy.

Clause 43. The composition of clause 34, wherein the oxides comprise oxides of the cation from the oxalate salt.

Clause 44. The composition of any one of clauses 27-43, wherein the polymer is polymeric CO.

Clause 45. The composition of any one of clauses 27-44, wherein a temperature of the source material is ambient temperature.

Clause 46. The composition of any one of clauses 27-45, wherein the source material is in an amount in the range of 3 to 10 mg.

Clause 47. The composition of any one of clauses 27-46, wherein the polymer is created from the source material at a reaction rate on the order of minutes or greater.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of creating a polymer comprising the steps of:
    loading a source material into an apparatus;
    sealing the apparatus;
    optionally pressurizing the apparatus to a selected pressure; and
    irradiating the source material in the apparatus with x-rays for an irradiation time, wherein the source material comprises an oxalate salt, and wherein the polymer is created from the source material.

2. The method of claim 1, wherein the source material comprises oxalate salts and substances that react in the presence of x-rays.

3. The method of claim 1, wherein the source material is a combination of oxalate salts and substances that do not react in the presence of x-rays.

4. The method of claim 1, wherein the source material is a combination of oxalate salts, substances that react in the presence of x-rays, and substances that do not react in the presence of x-rays.

5. The method of claim 2, wherein the substance that reacts in the presence of x-rays comprises $KBF_4$.

6. The method of claim 3, wherein the substance that does not react in the presence of x-rays comprises $BaCO_3$.

7. The method of claim 1, wherein the oxalate salt comprises a cation which is chosen from the group consisting of magnesium, hydrogen, barium, calcium, and strontium.

8. The method of claim 1, wherein the apparatus is a diamond anvil cell or a high volume press.

9. The method of claim 1, wherein said selected pressure is in the range of about 0.5 GPa to about 7 GPa.

10. The method of claim 1, wherein said x-rays have an irradiation energy in the range of about 7 keV to about 15 keV.

11. The method of claim 1, wherein said irradiation time is in the range of about 30 minutes to about 7 hours.

12. The method of claim 1, wherein the polymer has electrical applications.

13. The method of claim 1, wherein the polymer is a rocket fuel.

14. The method of claim 1, wherein the polymer is energetic, metastable, stable, or a combination thereof.

15. The method of claim 1, wherein $CO_2$ and oxides are dispersed in said polymer as measured by infrared spectroscopy.

16. The method of claim 7, wherein the oxides comprise oxides of the cation from the oxalate salt.

17. The method of claim 1, wherein the polymer is polymeric CO.

18. The method of claim 1, wherein a temperature of the source material is ambient temperature.

19. The method of claim 1, wherein the source material is in an amount in the range of 3 to 10 mg.

20. The method of claim 1, wherein the polymer is created from the source material at a reaction rate on the order of minutes or greater.

* * * * *